United States Patent
Levy-Abegnoli et al.

(10) Patent No.: US 8,312,541 B2
(45) Date of Patent: Nov. 13, 2012

(54) DETECTING NEIGHBOR DISCOVERY DENIAL OF SERVICE ATTACKS AGAINST A ROUTER

(75) Inventors: Eric Michel Levy-Abegnoli, Valbonne (FR); Pascal Thubert, La Colle sur Loup (FR); Richard Gayraud, Le Bar-sur-Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1252 days.

(21) Appl. No.: 11/826,594

(22) Filed: Jul. 17, 2007

(65) Prior Publication Data
US 2009/0024758 A1 Jan. 22, 2009

(51) Int. Cl.
H04L 29/06 (2006.01)
(52) U.S. Cl. ........................................ 726/23
(58) Field of Classification Search ............ 726/23
See application file for complete search history.

(56) References Cited

U.S. PATENT DOCUMENTS

| | | | |
|---|---|---|---|
| 5,958,053 A * | 9/1999 | Denker ........................ | 726/1 |
| 6,173,384 B1 * | 1/2001 | Weaver ........................ | 711/216 |
| 6,457,058 B1 * | 9/2002 | Ullum et al. ............... | 709/238 |
| 6,775,281 B1 * | 8/2004 | Brown ........................ | 370/392 |
| 6,976,177 B2 * | 12/2005 | Ahonen ....................... | 726/3 |
| 7,139,753 B2 * | 11/2006 | Bass et al. ................... | 1/1 |
| 7,140,041 B2 * | 11/2006 | Jeffries et al. .............. | 726/24 |
| 7,366,100 B2 * | 4/2008 | Anderson et al. ........... | 370/237 |
| 7,411,957 B2 * | 8/2008 | Stacy et al. ................. | 370/392 |
| 7,457,646 B2 * | 11/2008 | Mahany et al. ............. | 455/574 |
| 7,539,191 B1 * | 5/2009 | Jacobson et al. ........... | 370/392 |
| 7,554,914 B1 * | 6/2009 | Li et al. ....................... | 370/235 |
| 7,656,840 B2 * | 2/2010 | Krishnamurthi et al. ... | 370/331 |
| 8,161,549 B2 * | 4/2012 | Lahti et al. ................. | 726/22 |
| 2002/0065938 A1 * | 5/2002 | Jungck et al. .............. | 709/246 |
| 2003/0056094 A1 * | 3/2003 | Huitema et al. ............ | 713/157 |
| 2003/0204742 A1 * | 10/2003 | Gupta et al. ................ | 713/200 |
| 2004/0054924 A1 * | 3/2004 | Chuah et al. ............... | 713/201 |
| 2005/0149829 A1 * | 7/2005 | Lee ............................. | 714/776 |
| 2005/0180372 A1 * | 8/2005 | Cho et al. ................... | 370/342 |
| 2005/0257002 A1 * | 11/2005 | Nguyen ...................... | 711/114 |
| 2006/0005012 A1 * | 1/2006 | Deshpande et al. ......... | 713/160 |
| 2007/0083638 A1 * | 4/2007 | Pinkerton et al. .......... | 709/224 |

(Continued)

OTHER PUBLICATIONS

T. Aura; RFC 3972, Cryptographically Generated Addresses (CGA); Mar. 2005.*

(Continued)

*Primary Examiner* — Edan Orgad
*Assistant Examiner* — James Turchen
(74) *Attorney, Agent, or Firm* — Leon R. Turkevich (57) ABSTRACT

In one embodiment, a method comprises initiating neighbor discovery in response to detecting an absence of an IP destination address of a received data packet within a neighbor cache, including outputting a neighbor solicitation message targeting the IP destination address into a network served by the router, generating a hash index value based on the IP destination address combined with a randomized token stored in the router, and storing the data packet in a selected one of a plurality of pending message queues in the router based on the corresponding hash index value, each pending message queue configured for storing stored data packets having the corresponding hash index value and awaiting respective solicited neighbor advertisement messages from the network; and detecting whether the router is encountering a neighbor discovery denial of service attack based on a determined distribution of the stored data packets among the pending message queues.

21 Claims, 5 Drawing Sheets

U.S. PATENT DOCUMENTS

2007/0130427 A1* 6/2007 Lahti et al. .................. 711/133
2007/0280198 A1* 12/2007 Davis .......................... 370/351

OTHER PUBLICATIONS

Arkko, Aura, Kempf, Mantyla, Nikander, and Roe; Securing IPv6 Neighbor and Router Discovery; Sep. 28, 2002; WiSe; ACM.*

Sang-Heon Shim, Kyoung-Min Yoo, Kyeong-Eun Han, Chol-Ku Kang, Won-Ho So, Jong-Tae Song, Young-Chon Kim; Destination Address Monitoring Scheme for Detecting DDoS Attack in Centralized Control Network; 2006; IEEE.*

"Normal Distribution", [online], [retrieved on Jun. 22, 2007]. Retrieved from the Internet: <URL:http://en.wikipedia.org/wiki/Normal_distribution>, Jun. 22, 2006, pp. 1-17.

Narten et al., "Neighbor Discovery for IP Version 6 (IPv6)", Network Working Group, Request for Comments: 2461, Dec. 1998, pp. 1-93.

Hinden et al., "Internet Protocol Version 6 (IPv6) Addressing Architecture", Network Working Group, Request for Comments: 3513, Apr. 2003, pp. 1-26.

Nikander et al., "IPv6 Neighbor Discovery (ND) Trust Models and Threats", Network Working Group, Request for Comments: 3756, May 2004, pp. 1-23.

Arkko et al., "SEcure Neighbor Discovery (SEND)", Network Working Group, Request for Comments: 3971, Mar. 2005, pp. 1-56.

Levy-Abegnoli et al., U.S. Appl. No. 11/636,433, filed Dec. 11, 2006.

Levy-Abegnoli et al., U.S. Appl. No. 11/808,059, filed Jun. 6, 2007.

Thubert et al., U.S. Appl. No. 11/808,362, filed Jun. 8, 2007.

* cited by examiner

DETECTING NEIGHBOR DISCOVERY DENIAL OF SERVICE ATTACKS AGAINST A ROUTER

TECHNICAL FIELD

The present disclosure generally relates to detecting a denial of service (DoS) attack against a router performing neighbor discovery, for example an Internet Protocol version 6 (IPv6) router configured for executing Neighbor Discovery according to the Internet Engineering Task Force (IETF) Request for Comments (RFC) 2461, or Secure Neighbor Discovery (SEND) according to RFC 3971.

BACKGROUND

An IPv6 router implements neighbor discovery, described in RFC 2461, based on storing Neighbor Cache Entries (NCEs) within a Neighbor Cache. Each neighbor cache entry is configured for storing reachability information for a neighboring network node that is identified by its IP address. If the IPv6 router receives a packet having an IP destination address within the address prefix assigned to the router but specifying an unresolved IP address value (i.e., the reachability of the IP destination address via a link layer address has not been resolved), the IPv6 router according to RFC 2461 creates a neighbor cache entry that specifies the unresolved IP destination address and a corresponding reachability state indicating an incomplete status; the router also initiates Neighbor Discovery by outputting a Neighbor Solicitation (NS) message specifying the unresolved IP destination address, and waiting for a corresponding solicited Neighbor Advertisement (NA) message that provides link layer information for reaching the unresolved IP destination address. If the solicited NA message is not received after a prescribed minimum waiting interval (e.g., 2 seconds), the received message is discarded and the neighbor cache entry is removed from memory.

The commitment of storing the unresolved IP destination address in the neighbor cache entry for the prescribed minimum waiting interval (e.g., 2 seconds) creates a vulnerability in the router that enables a remote attacking node to initiate a neighbor discovery denial of service (DoS) attack against the router, described in detail in Section 4.3.2 of RFC 3756. In summary, an attacking node fabricates IP destination addresses within the subnet prefix assigned to the router, and sends the packets with the fabricated IP destination addresses to the router: the router must attempt to resolve the fabricated IP destination addresses by committing neighbor cache entries for the fabricated IP destination addresses, and outputting neighbor solicitation (NS) messages for determining reachability of the fabricated IP destination addresses. Hence, the neighbor cache will become filled with neighbor cache entries of unresolved IP addresses (fabricated by the attacking node) having valid subnet prefixes but invalid suffixes, depleting available resources for performing neighbor discovery for legitimate host nodes attempting to reach a destination node in the network served by the router.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises receiving, by a router, a data packet specifying an Internet Protocol (IP) destination address having an address prefix assigned to the router; initiating neighbor discovery by the router in response to detecting an absence of the IP destination address within a neighbor cache in the router, including outputting a neighbor solicitation message targeting the IP destination address into a network served by the router, generating a hash index value based on a combination of the IP destination address with a randomized token stored in the router, and storing the data packet in a selected one of a plurality of pending message queues in the router based on the corresponding hash index value, each pending message queue configured for storing stored data packets having the corresponding hash index value and awaiting respective solicited neighbor advertisement messages from the network; and detecting whether the router is encountering a neighbor discovery denial of service attack based on a determined distribution of the stored data packets among the pending message queues.

In another embodiment, an apparatus comprises an Internet Protocol (IP) network interface circuit configured for receiving a data packet specifying an IP destination address having an address prefix assigned to the apparatus; a neighbor cache circuit configured for storing IP addresses of IP nodes having been determined as reachable by the apparatus; a plurality of pending message queue circuits, each indexed by a corresponding hash index value; and a neighbor discovery circuit. The neighbor discovery circuit is configured for initiating neighbor discovery in response to detecting an absence of the IP destination address within the neighbor cache circuit. The neighbor discovery circuit is configured for initiating neighbor discovery based on generating a neighbor solicitation message targeting the IP destination address and for output by the IP network interface circuit into a network served by the apparatus, generating the hash index value for the data packet based on a combination of the IP destination address with a randomized token stored in the apparatus, and storing the data packet in a selected one of the pending message queue circuits based on the corresponding hash index value for the data packet matching the corresponding hash index value of the selected one pending message queue circuit, each pending message queue circuit configured for storing stored data packets having the corresponding hash index value and awaiting respective solicited neighbor advertisement messages from the network. The neighbor discovery circuit further is configured for detecting a neighbor discovery denial of service attack based on a determined distribution of the stored data packets among the pending message queue circuits.

DETAILED DESCRIPTION

Particular embodiments enable an IPv6 router to automatically detect a neighbor discovery Denial of Service (DoS) attack based on determining a distribution of the destination addresses specified within data packets received by router. In particular, since a neighbor discovery DoS attack is based on a remote attacking node sending packets with a fabricated IP destination address within the subnet prefix assigned to the router, the particular embodiments can store each received packet lacking a known destination (based on a detected absence of the corresponding IP destination address within a neighbor cache) into a data structure in a secure manner and that is distinct from the neighbor cache, preventing overflow of the neighbor cache resources. Each received packet lacking a known destination can be stored in one of a plurality of pending message queues based on generating a hash index value: the hash index value is generated based on applying a prescribed hash function to a combination of the IP destination address specified in the packet with a randomized token stored in the router; a neighbor solicitation message targeting the IP destination address specified in the packet also can be output into a network served by the router in an attempt to obtain reachability information for the destination address.

The particular embodiments also can establish that the IP destination address for any packet stored in any of the pending message queues is not added to the neighbor cache until validation of a corresponding received solicited neighbor advertisement message that identifies the corresponding IP destination address is reachable, based on the retrieval of the data packet from the corresponding pending message queue. Hence, each pending message queue can be indexed by a corresponding hash index value and can be configured for storing stored data packets having the corresponding hash index value and awaiting respective solicited neighbor advertisement messages from the network.

Consequently, the particular embodiments enable the IPv6 router to automatically detect the neighbor discovery DoS based on detecting the determined distribution of the stored data packets among the pending message queues: since a remote attacking node typically sends packets with a fabricated IP destination address that can tend to be randomly generated within the subnet prefix assigned to the router, an attack can be detected based on a determined distribution of the stored data packets being substantially even among the pending message queues based on the distribution of the fabricated IP destination addresses within the subnet prefix assigned to the router. In contrast, normal traffic destined for a particular resource or service within the network (e.g., a server providing a particular network-based service such as a Web server, a voice over IP gateway or server) will tend to have IP destination addresses specifying a specific limited set of IP address values, for example based on preconfigured settings or redirect settings obtained from an external source such as a domain name server. Hence, the router can detect that there is no neighbor discovery DoS attack based on the determined distribution of the stored data packets being substantially uneven among the pending message queues.

Hence, particular embodiments can enable the neighbor cache to be protected from neighbor discovery DoS attacks by limiting insertion of IP addresses into the neighbor cache only to those IP addresses having received a corresponding validated solicited neighbor advertisement message identifying the corresponding IP address is reachable.

The storage of the received data packets in pending message queues that are distinct from the neighbor cache based on generating respective hash index values can enable the router to implement a stateless neighbor discovery with respect to the neighbor cache, while enabling the stored messages in the pending message queues to serve as a queue for packets awaiting address resolution as required under RFC 2461. The stored messages in the pending message queues also can serve as an identifier of the destination IP addresses awaiting address resolution for purposes of validation of solicited neighbor advertisement messages, and an indicator of whether the received data packets in the pending message queues represent legitimate traffic from client devices, or packets generated for a neighbor discovery DoS attack, based on the distribution of the messages within the pending message queues.

Figure 1:
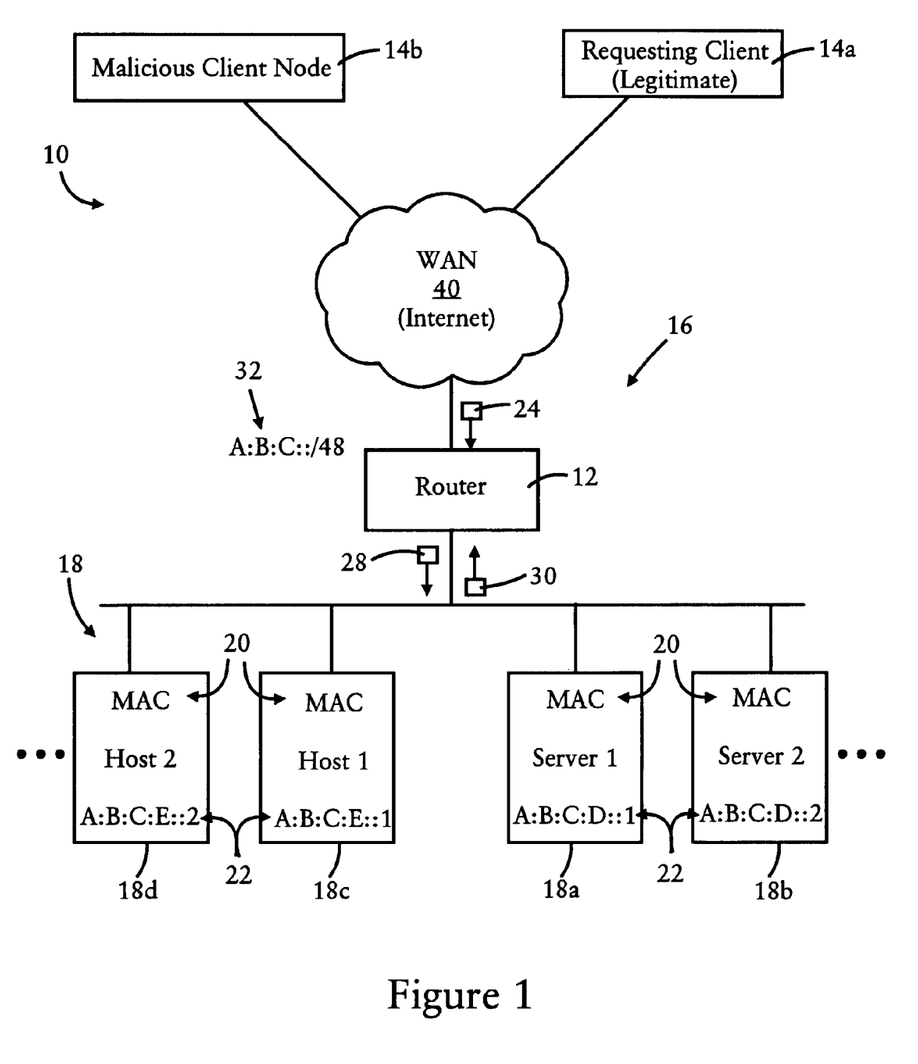
FIG. 1 illustrates an example system having a router configured for detecting neighbor discovery denial of service attacks, according to an example embodiment.

FIG. 1 is a diagram illustrating an example system 10 having a router 12 providing access for remote clients (e.g., 14a, 14b) to a local network 16, for example a local area network or a private IP network having multiple internal link layer switches and network layer (e.g., IP) routers for reaching network nodes. As illustrated in FIG. 1, the local area network 16 can be implemented for example as a single layer 2 domain having a link-local scope, where each network node 18 in the local area network 16 can be reached via a corresponding assigned link layer (e.g., Media Access Control) address 20 and/or a link-local address as described in RFC 2461 or RFC 3513. Any one of the network nodes 18 in the local area network 16 also can include a globally-reachable IPv6 address 22.

Hence, the router 12 can receive a data packet 24 from a requesting client 14a for service from a server (e.g., 18a) reachable via the router 12 based on its corresponding globally-reachable IPv6 address 22, where, the data packet 24 can specify the corresponding IPv6 address (e.g., "A:B:C:D::1") 22 within the destination address field in order to reach the server 18a. If the router 12 does not have a neighbor cache entry 26, illustrated in FIG. 2, for the corresponding destination address "A:B:C:D::1", the router 12 can output a neighbor solicitation (NS) message 28 in an attempt to obtain reachability information for the specified destination address based on receiving a corresponding neighbor advertisement (NA) message 30 specifying the reachability information for the specified destination address.

However, the received packet 24 also may be from a malicious client 14b that is attempting a neighbor discovery Denial of Service (DoS) attack based on transmitting multiple data packets 24 having random destination address values within the IPv6 address prefix (e.g., "A:B:C::/48") 32 assigned to the router 12.

As described below, the router 12 can be configured for detecting whether the router 12 is encountering a neighbor discovery denial of service (DoS) attack based on a determined distribution of the stored data packets among pending message queues, where each pending message queue is configured for storing stored data packets having a corresponding hash index value and awaiting respective solicited neighbor advertisement messages 30 from the network 16.

Figure 2:
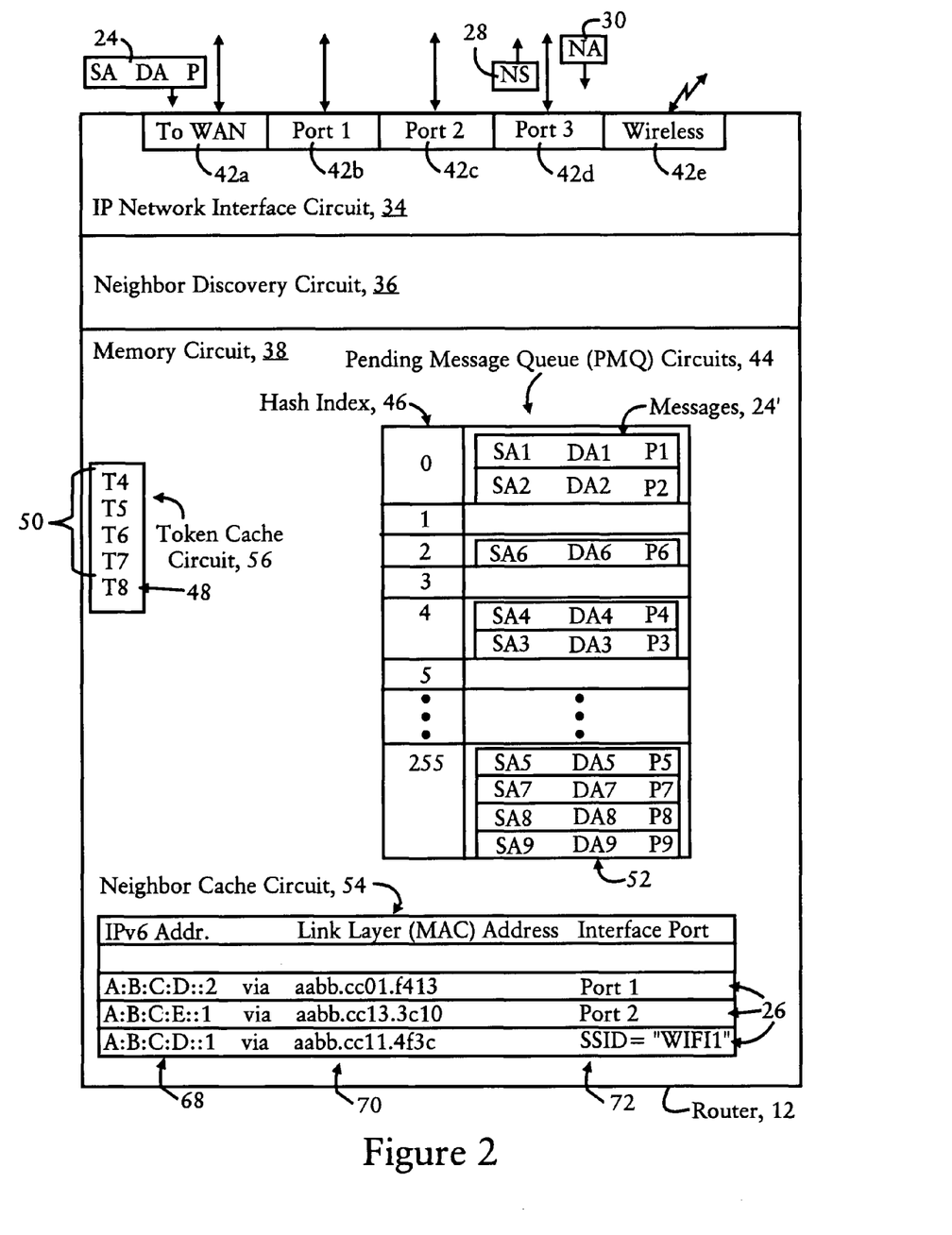
FIG. 2 illustrates an example router from the system of FIG. 1, according to an example embodiment.

FIG. 2 illustrates an example router 12 according to an example embodiment. The router 12 includes an IP network interface circuit 34, a neighbor discovery circuit 36, and a memory circuit 38. The IP network interface circuit 34 can be configured for sending and receiving data packets (e.g., data packet 24) to and from a wide area network (e.g., the Internet) 40 illustrated in FIG. 1 via a wide area network (WAN)

interface port 42a; the IP network interface circuit 34 also can be configured for sending and receiving data packets (e.g., the neighbor solicitation message 28 or the neighbor advertisement message 30) into and from the local network 16 via interface ports 42b, 42c, 42d, or 42e. Any one of the wired interface ports (e.g., 42a, 42b, 42c, and/or 42d) can be implemented as wired Ethernet (e.g., IEEE 802.3) or T1/E1 ports, whereas the wireless port 42e can be implemented as a wireless Ethernet (e.g., IEEE 802.11) port.

The neighbor discovery circuit 36 can be configured for performing neighbor discovery operations in accordance with RFC 2461 and RFC 3971. As described below, the neighbor discovery circuit 36 also can be configured for storing received messages 24' awaiting respective solicited neighbor advertisement messages 30 into selected pending message queue (PMQ) circuits 44 having respective hash index values 46. The neighbor discovery circuit 36 also can be configured for detecting a neighbor discovery denial of service attack based on a determined distribution of the stored data packets 24' among the pending message queue circuits 44. Although not described herein, it will be readily apparent that the neighbor discovery circuit 36 also can be configured for performing additional router operations as known in the art (e.g., sharing routing information with other routers according to existing routing protocols), alternately the router operations can be implemented by other circuitry (not shown) in the router 12.

The memory circuit 38 can be configured for including the pending message queue circuits 44, a neighbor cache circuit 54 having multiple neighbor cache entries 26, and a token cache circuit 56. The token cache circuit 56 can be configured for storing randomized tokens having been generated by the neighbor discovery circuit 36; as described below, the neighbor discovery circuit 36 can periodically generate, for a corresponding prescribed time interval (e.g., one second, one minute, etc.), a corresponding randomized token T[i] (e.g., T8) 48 for use in generating a hash index value 46 for storing the received data packets into one of the pending message queue circuits 44. The neighbor discovery circuit 36 also can store in the token cache circuit 56 prior randomized tokens 50 having been used for respective preceding time intervals (e.g., prior seconds, prior minutes, etc.), where stale randomized tokens are deleted based on the corresponding time interval having exceeded a prescribed aging interval between transmitting a neighbor solicitation message 28 and receiving the corresponding solicited neighbor advertisement message 30.

As described below, no destination IP address 52 from a stored data packet 24' is added to the neighbor cache circuit 54 until reception of a corresponding solicited neighbor advertisement message 30 that identifies the corresponding IP address 52 is reachable, and based on validation of the neighbor advertisement message 30 by the neighbor discovery circuit 36, described below. Hence, the neighbor cache circuit 54 is protected from neighbor discovery DoS attacks by the malicious remote node 14b. Further, the neighbor discovery circuit 36 can be configured for monitoring the distribution of the stored data packets 24' among the pending message queue circuits 44 based on the hash index values 46, where a substantially even distribution of stored data packets 24' among the pending message queue circuits 44 indicates a random distribution of the IP destination addresses 52 within the address prefix 32 assigned to the router, and a substantially uneven distribution of the stored data packets 24' among the pending message queue circuits 44 indicates normal activity based on an attempt to resolve specific IP addresses within the network 16.

Any of the disclosed circuits of the router 12 (including the IP network interface circuit 34, the neighbor discovery circuit 36, and the memory circuit 38, and their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal memory (e.g., within the memory circuit 38) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 38 can be implemented, for example, using a non-volatile memory such as a programmable read only memory (PROM) or an EPROM, and/or a volatile memory such as a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 3A:
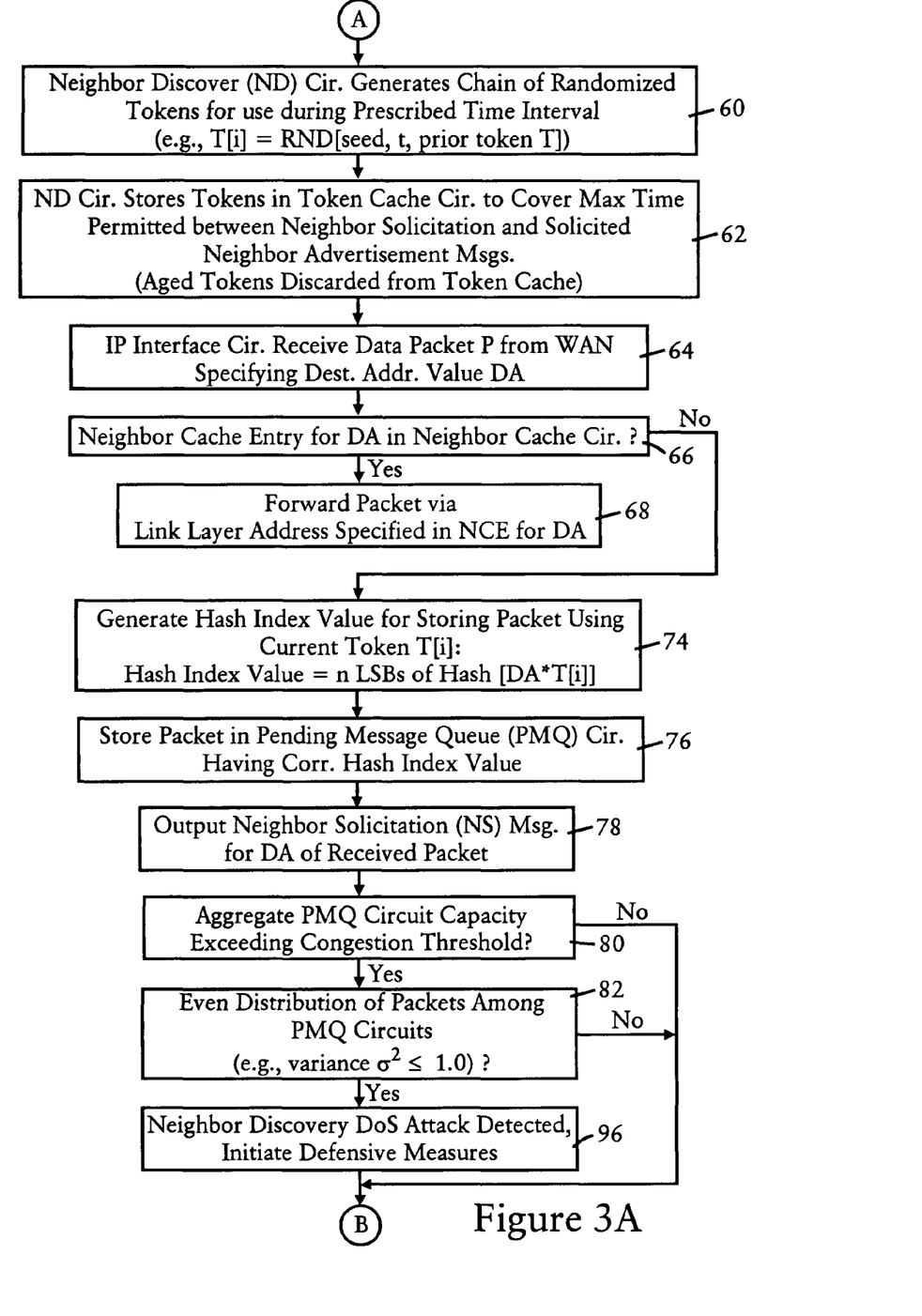
FIGS. 3A and 3B illustrate an example method for detecting the neighbor discovery denial of service attacks, according to an example embodiment.
Figure 3B:
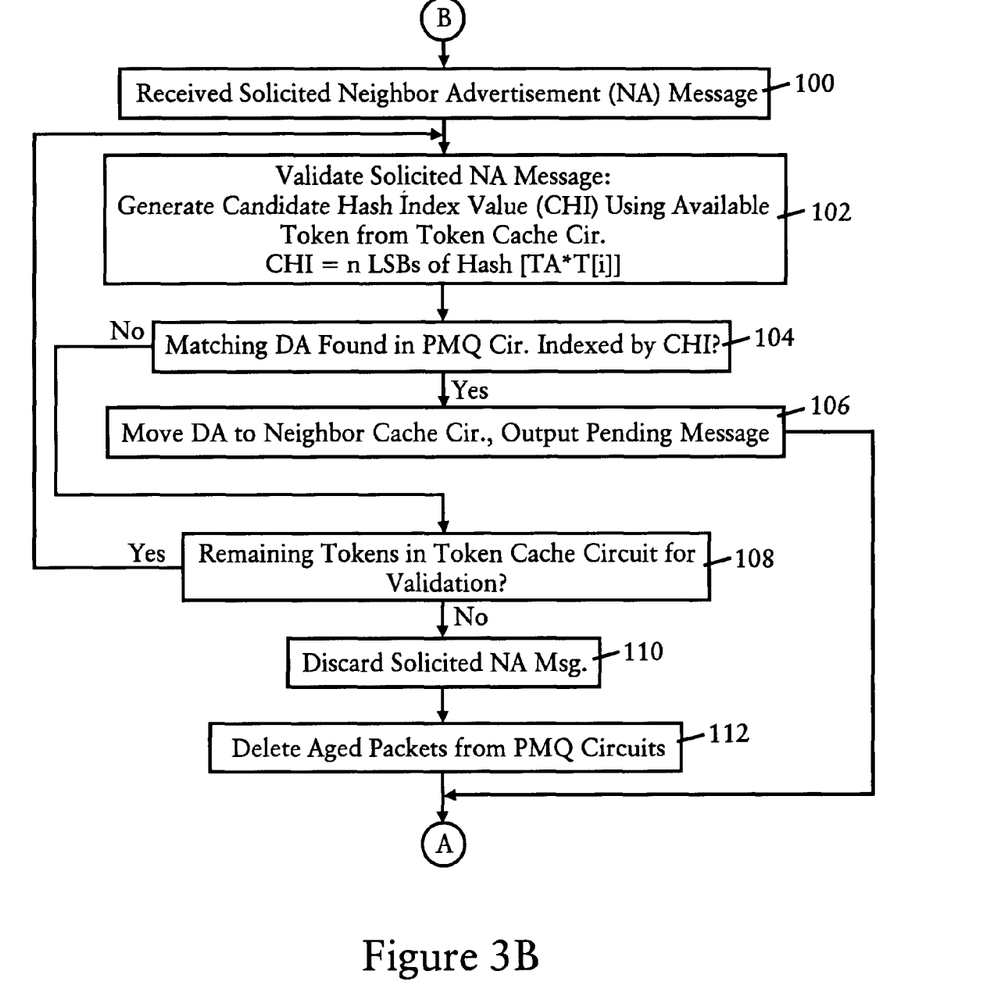

FIGS. 3A and 3B illustrates an example method by the router 12 of FIGS. 1 and 2 of detecting neighbor discovery denial of service attacks, according to an example embodiment. The steps described in FIGS. 3A and 3B can be implemented as executable code stored on a computer readable medium (e.g., floppy disk, hard disk, ROM, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The neighbor discovery circuit 36 generates in step 60 a token 48 for use during a prescribed time interval for storing received data packets 24 into a selected pending message queue circuit 44 based on generating a corresponding hash index value 46. In particular, the token 48 and the prior stored tokens 50 are kept secret within the router 12 in order to ensure that the hash indexing utilized by the router 12 for inserting messages 24 into the pending message queue circuit 44 is not detectable by the malicious node 14b. For example, the token "T[i]" 48 for the given time interval "i" may be generated as a randomized token based on a prescribed secret seed value, plus other variable parameters such as a time value "t", a prior stored token "T" 50, etc. The generated token 48 is stored in the token cache circuit 56 by the neighbor discovery circuit 36 in step 62, along with the prior randomized tokens 50 that have been used during respective preceding time intervals. The neighbor discovery circuit 36 also deletes in step 62 any aged tokens from the token cache circuit 56 that have exceeded the prescribed aging interval between outputting a neighbor solicitation message 28 and receiving a corresponding neighbor advertisement message 30.

The IP interface circuit 34 receives in step 64 a data packet 24, for example via the interface port 42*a* from the wide area network 40 and that specifies a destination address value (e.g., "DA"). In response to reception of the data packet 24, the neighbor discovery circuit 36 determines in step 66 whether the neighbor cache circuit 54 includes a neighbor cache entry 26 specifying reachability of the corresponding specified destination address (e.g. "DA"). As illustrated in FIG. 2, the neighbor cache circuit 54 includes neighbor cache entries 26 of reachable IP addresses 68 that include reachability information such as a link layer address 70 and/or an interface port 72. As described previously, the neighbor discovery circuit 36 is configured for not adding any IP address to the neighbor cache circuit 54 until reception of a corresponding neighbor advertisement message 30 that specifies the corresponding reachability information 70 and/or 72 for reaching the corresponding IP address 68. Hence, if in step 66 a neighbor cache entry 26 is identified for the destination address specified in the received data packet 24, the data packet is output in step 68 by the neighbor discovery circuit 36, via one of the interface ports (e.g., 42*d*) based on the corresponding reachability information 70 and/or 72.

If in step 66 the neighbor discovery circuit 36 determines there is no neighbor cache entry 26 in the neighbor cache circuit 54 for the destination address (e.g., "DA") of the received data packet 24, the neighbor discovery circuit 36 initiates neighbor discovery in step 74 based on storing the received data packet 24 within a selected one of the pending message queue circuits 44 based on a corresponding hash index value 46 for the destination address (e.g., "DA"), and outputting a corresponding neighbor solicitation message 28 targeting the IP destination address (e.g., "DA") of the received data packet 24. The neighbor discovery circuit 36 can generate in step 74 a hash index value for storing the received message 24 based on combining the IP destination address ("DA") of the received data packet 24 with the current secure randomized token (e.g., T[i]="T8") 48, and applying a prescribed hash function ("Hash[x]") on the combination of the IP destination address and the randomized token. For example, assuming each randomized token 48, 50 is a 32-bit value, the combination of the IP destination address ("DA") of the received data packet 24 and the current 32-bit secure randomized token (e.g., T[i]="T8") 48 can be implemented by concatenating the 128-bit IPv6 destination address ("DA") with the 32-bit randomized token (e.g., T[i]="T8") 48, resulting in the 160-bit combination "x=DA*T[i]", where the symbol "*" represents the concatenation of the token "T[i]" following the 128-bit destination address value "DA". The neighbor discovery circuit 36 obtains the hash index value from a prescribed number "n" of the least significant bits (LSBs) of the resulting hash value "Hash[x]". As illustrated with respect to FIG. 2, the neighbor discovery circuit 36 can use a prescribed number (n=8) of LSBs in order to provide an addressable range of 256 hash index values 46.

Hence, the hash index value generated in step 74 is based on the IP destination address and the corresponding randomized token 48 in effect for the corresponding time interval: the neighbor discovery circuit 36 stores in step 76 the received data packet 24 into the corresponding message queue circuit 44 having the corresponding hash index value. For example, if the generated hash index value for the received data packet 24 in step 74 equals "255", the neighbor discovery circuit 36 stores the received data packet 24 in to the pending message queue circuit 44 having the corresponding hash index value "255". The neighbor discovery circuit 36 also generates in step 78, for output by the IP network interface circuit 34, a neighbor solicitation message 28 targeting the destination address of the received data packet.

The neighbor discovery circuit 36 also can be configured for detecting whether the router 12 is encountering a neighbor discovery denial of service attack, for example based on determining in step 80 after each generated neighbor solicitation message 28 whether an aggregate pending message queue circuit capacity exceeds a prescribed congestion threshold, for example whether a prescribed threshold (e.g., 80%) of the available memory space allocated for the pending message queue circuits 44 has been exceeded. If no congestion in the aggregate capacity of the pending message queue circuits 44 is detected, the neighbor discovery circuit 36 can continue to perform neighbor discovery as described in FIG. 3B.

If in step 80 an aggregate circuit capacity of the pending message queue circuits 44 exceeds a prescribed congestion threshold, the neighbor discovery circuit 36 can determine in step 82 whether the distribution of the stored data packets 24' is such that the stored data packets 24' have a substantially even distribution among the pending message queue circuits 44.

Figure 4:
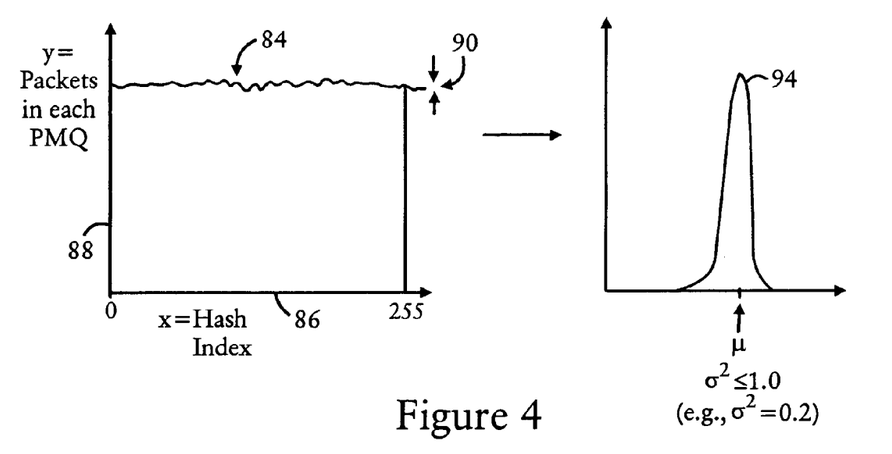
FIG. 4 illustrates an example distribution of stored messages in the pending message queue of FIG. 2 based on the router receiving packets specifying random IP destination addresses from an attacking router, according to an example embodiment.

For example, FIG. 4 illustrates an example determined distribution 84 of stored data packets among the pending message queue circuits 44, where the x-axis 86 represents the pending message queue circuits 44 identified by their respective hash indices 46, and the y-axis 88 represents the quantity (i.e., number) of stored data packets 24' in each corresponding pending message queue circuit 44. The neighbor discovery circuit 36 can determine the determined distribution 84 based on identifying the respective numbers (e.g., y-axis values) of the stored data packets among the respective pending message queues, for example based on storing the numbers (e.g., y-axis values) for the respective pending message queue circuits 44 in the memory circuit 38, or storing at least one of the differences in the numbers (e.g., y-axis values) in the memory circuit 38 for calculation of a variance value 90 or 90', described below.

As illustrated in FIG. 4, the determined distribution 84 of the stored data packets 24' is substantially even among the pending message queue circuits 44; for example, the determination of an even distribution 84 can be determined from the determined variance (VAR[Max[y], Min[y]) 90 between the minimum and maximum quantity of stored packets in any of the pending message queue circuit 44, relative to the average quantity (AVG[y]) of stored data packets 24'; hence, as an example the neighbor discovery circuit 36 can conclude a substantially even distribution 84 of stored data packets 24' among the pending message queue circuits 44 if the determined variance (e.g., VAR[9,6]=3) 90 relative to the average quantity (AVG[y]=8 stored packets) is less than 40% (e.g., VAR/AVG), indicating a random distribution of the destination addresses 52 relative to the applied tokens 48, 50. The neighbor discovery circuit 36 also can be configured for applying statistical analyses to conclude that the distribution 84 of stored data packets is substantially even based on the normalized distribution (i.e., Gaussian distribution) 94 of the number of stored data packets having a statistical variance ($\sigma^2$) about the mean ($\mu$) of about ($\sigma^2 \leq 1.0$ (e.g., $\sigma^2=0.2$) as illustrated in FIG. 4.

Figure 5:
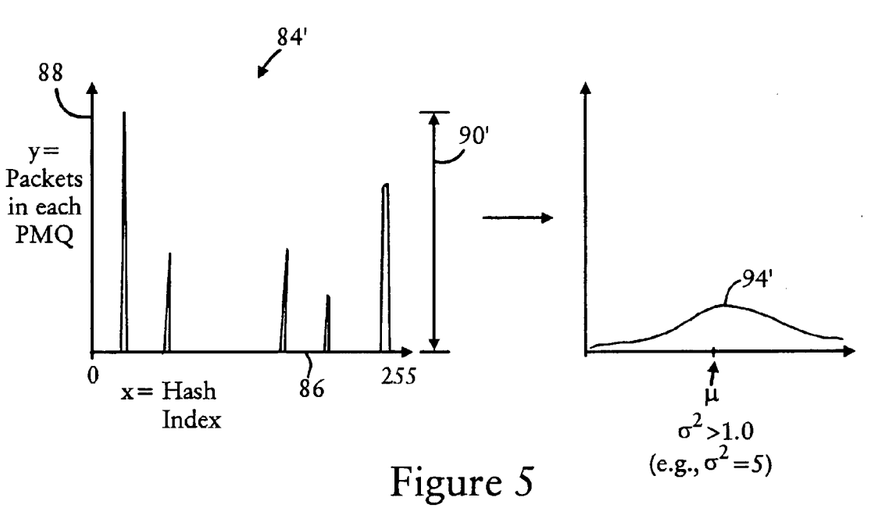
FIG. 5 illustrates an example distribution of stored messages in the pending message queue of FIG. 2 based on the router receiving legitimate host requests for reaching identifiable destination network nodes in the network of FIG. 1, according to an example embodiment.

In contrast, the neighbor discovery circuit 36 can conclude that the distribution 84' of stored data packets 24' as illustrated in FIG. 5 can be substantially uneven, for example based on the corresponding variance 90' (VAR[Max[y], Min[y]]=VAR [30,0]) being equal to or greater than the average quantity (AVG[y]), indicating that only a small subset of the available destination addresses are receiving a substantial number of client requests. The neighbor discovery circuit 36 also can be configured for applying statistical analyses to conclude that the distribution 84' of stored data packets is deemed to be substantially uneven among the pending message queue circuits 44 based on the normalized distribution (i.e., Gaussian distribution) 94' having a statistical variance ($\sigma^2$) about the mean ($\mu$) of at least 1.0, ($\sigma^2 \geq 1.0$) (e.g., $\sigma^2=5.0$) as illustrated in FIG. 5. It should be apparent that the aforementioned values for determining variance are only by way of illustration to demonstrate that one can determine whether the data packets 24' are evenly distributed among the PMQ circuits 44, as illustrated in FIG. 4.

Hence, if the neighbor discovery circuit 36 determines in step 82 that the stored data packets 24' do not have a substantially even distribution among the pending message queue circuits 44 (as identified by their respective hash indices 46), neighbor discovery operations continue as described below with respect to FIG. 3B. However, if the neighbor discovery circuit 36 determines in step 82 that the distribution 84 of stored data packets is substantially even (e.g., based on comparing the variance 90 to the average quantity AVG, determining the statistical variance $\sigma^2 \leq 1.0$, etc.), the neighbor discovery circuit 36 determines in step 96 that a neighbor discovery DoS attack is detected, and initiates defensive measures, for example setting a Simple Network Management Protocol (SNMP) trap, initiating an electronic message (e.g., e-mail message, paging message, etc.) to a network administrator, or automatically initiating defensive filters to block traffic received from the wide area network 40 and specifying unknown destination addresses, etc. Hence, the neighbor discovery circuit 36 is able to detect the neighbor discovery denial of service attack based on the determined distribution of the stored data packets 24' among the pending message queue circuits 44.

It will become apparent that the neighbor discovery circuit 36 can detect the neighbor discovery denial of service attack even though the attacking node 14b does not employ purely random addresses within the subnet prefix 32 of the network. For example, if the distribution of fabricated address within the subnet prefix 32 used by the attacking node 14b is not random, but rather exhibits some pattern (e.g., every other number value, every third number, every fourth number, etc.), the neighbor discovery circuit 36 still can detect the neighbor discovery denial of service attack based on the determined distribution of stored data packets 24' being substantially even (as illustrated in FIG. 4), or based on the logical converse of determining that the determined distribution of stored data packets 24' is not substantially uneven (as illustrated in FIG. 5). Hence, step 82 can be implemented either by concluding a neighbor discovery DoS attack is present based on determined substantially even distribution of the stored data packets 24' (i.e., detecting the distribution of FIG. 4), or based on a determined absence of a substantially uneven distribution of the stored data packets 24' (i.e., a determined absence of the distribution of FIG. 5).

It also will become apparent that the distribution of stored data packets 24' can still be applied despite changing the tokens 48, 50 for hashing the received messages into the PMQ circuits 44, since the number packets 24 from a malicious node 14b during a neighbor discovery DoS attack will be substantially greater than the rate of change in tokens 48, 50, such that the change in tokens 48, 50 in step 74 will not be sufficient to change the even distribution of stored data packets 24'.

Referring to FIG. 3B, the neighbor discovery circuit 36 also validates solicited neighbor advertisement messages 30 having been received in step 100 by the network interface circuit 34. In particular, the neighbor discovery circuit 36 validates the solicited neighbor advertisement message 30 based on generating in step 102 a candidate hash index value (CHI), similar to step 74, based on concatenating the target address (TA) specified in the solicited neighbor advertisement message 30 with one of the available tokens "T[i]" 48 or 50 in the token cache circuit 56. Hence, the neighbor discovery circuit 36 applies in step 102 the same hash operation as in step 74, and uses the "n" most least significant bits of the hashed value obtain the candidate hash index value (CHI). The candidate hash index value is used by the neighbor discovery circuit 36 in step 104 to determine whether the candidate hash index value (CHI) points to a corresponding PMQ circuit 44 that stores a destination address 52 that matches the target address (TA): the detection of a matching destination address 52 in one of the stored messages 24' in the pending message queue circuit 44 identified by the candidate hash index value validates the received neighbor advertisement message 30, enabling the neighbor discovery circuit 36 to move in step 106 the validated destination address 52 to the neighbor cache circuit 54 by creating a new neighbor cache entry 26 specifying the corresponding reachability information. The neighbor discovery circuit 36 also outputs the stored message 24' from the pending message queue circuit 44 for delivery to the destination node in the network 16.

If in step 104 no matching destination address 52 is found in the PMQ circuit 44 indexed by the candidate hash index value CHI, the neighbor discovery circuit 36 checks in step 108 whether there are any remaining tokens (e.g., the prior tokens 50) in the token cache circuit 56 that have not been used to test validation of the received neighbor advertisement message 30. Any remaining tokens are successively applied in step 102 to determine if the corresponding candidate hash index value results in a match between any stored destination address 52 within the pending message queue circuit indexed by the candidate hash index value (CHI) and the target address (TA) specified in the neighbor advertisement message 30. If none of the tokens 48, 50 within the token cache circuit 56 provide a matching destination address in step 104 or 108, the neighbor discovery circuit 36 discards the solicited neighbor advertisement message in step 110, and deletes in step 112 any aged packets 24' from the pending message queue circuits 44 that have exceeded the prescribed required interval between the neighbor solicitation message 28 and the corresponding solicited neighbor advertisement message 30.

Although not illustrated, the neighbor discovery circuit 36 also can determine whether a denial of service (DoS) attack is attempted for a specific IP address, for example if the number of stored messages 24' for any one queue circuit 44 reaches a maximum threshold, and where no corresponding solicited neighbor advertisement message 30 has been received by the corresponding prescribed required interval between the corresponding neighbor solicitation message 28 and the corresponding solicited neighbor advertisement message 30.

According to the example embodiments, a neighbor cache circuit is protected from neighbor discovery DoS attacks, where the storage of received messages awaiting resolution (based on validating received solicited neighbor advertisement messages) is monitored to detect neighbor discovery DoS attacks.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a router, a data packet specifying an Internet Protocol (IP) destination address having an address prefix assigned to the router;
initiating neighbor discovery by the router in response to detecting an absence of the IP destination address within a neighbor cache in the router, including outputting a neighbor solicitation message targeting the IP destination address into a network served by the router, generating a hash index value based on a combination of the IP destination address with a randomized token stored in the router, and storing the data packet in a selected one of a plurality of pending message queues in the router based on the corresponding hash index value, each pending message queue distinct from the neighbor cache and configured for storing stored data packets associated with the corresponding hash index value and awaiting respective solicited neighbor advertisement messages from the network; and
detecting whether the router is encountering a neighbor discovery denial of service attack based on a determined distribution of the stored data packets among the pending message queues.

2. The method of claim 1, wherein the detecting includes detecting the neighbor discovery denial of service attack by the router based on the determined distribution of the stored data packets being substantially even among the pending message queues.

3. The method of claim 1, wherein the detecting includes detecting by the router that the router is not encountering the neighbor discovery denial of service attack based on the determined distribution of the stored data packets being substantially uneven among the pending message queues.

4. The method of claim 1, wherein no IP address is added to the neighbor cache until reception of a corresponding solicited neighbor advertisement message identifying the IP address is reachable.

5. The method of claim 1, further comprising:
receiving by the router a solicited neighbor advertisement message from the network served by the router and that specifies a target IP address;
validating by the router the solicited neighbor advertisement message based on generating a candidate hash index value based on a combination of the target IP address with the randomized token, and determining whether target IP address is within one of the stored data packets stored in the pending message queue corresponding to the candidate hash index value; and
adding by the router the target IP address to the neighbor cache, and outputting the one stored data packet having the target IP message from the pending message queue corresponding to the candidate hash index value, based on successful validation of the solicited neighbor advertisement message.

6. The method of claim 5, further comprising:
generating and storing, by the router for a corresponding prescribed time interval, the randomized token for use in storing received data packets into one of the pending message queues during the corresponding time interval, and
deleting by the router, from a token cache storing prior randomized tokens and having been used during respective preceding time intervals, a stale one of the prior randomized tokens based on the corresponding preceding time interval having exceeded a prescribed aging interval for receiving a corresponding solicited neighbor advertisement message;
the validating including repeating the generating of a corresponding candidate hash index value, for each prior random randomized token stored in the token cache, to determine whether target IP address is within the one stored data packets stored in the pending message queue corresponding to the candidate hash index value for the corresponding preceding time interval.

7. The method of claim 1, wherein the hash index value for the IP destination address is generated based on:
generating the combination based on concatenating the IP destination address with the randomized token;
generating a first hash value based on applying the combination to a prescribed hash function; and
selecting a prescribed number of least significant bits from the first hash value as the hash index value for the IP destination address.

8. The method of claim 7, further comprising:
generating and storing, by the router for a corresponding prescribed time interval, the randomized token for use in storing received data packets into one of the pending message queues during the corresponding time interval, and
deleting by the router, from a token cache storing prior randomized tokens having been used during respective preceding time intervals, a stale one of the prior randomized tokens based on the corresponding preceding time interval having exceeded a prescribed aging interval for receiving a corresponding solicited neighbor advertisement message;
the randomized token and the prior randomized tokens kept secret within the router.

9. The method of claim 1, further comprising deleting by the router any stored data packets having exceeded a prescribed aging interval for receiving the corresponding solicited neighbor advertisement message.

10. The method of claim 1, wherein each pending message queue has a corresponding number of the stored data packets, the determined distribution of the stored data packets among the pending message queues determined based on identifying the respective numbers of the stored data packets among the respective pending message queues.

11. An apparatus comprising:
an Internet Protocol (IP) network interface circuit configured for receiving a data packet specifying an IP destination address having an address prefix assigned to the apparatus;
a neighbor cache circuit configured for storing IP addresses of IP nodes having been determined as reachable by the apparatus;
a plurality of pending message queue circuits, each indexed by a corresponding hash index value; and
a neighbor discovery circuit configured for initiating neighbor discovery in response to detecting an absence of the IP destination address within the neighbor cache circuit, the neighbor discovery circuit configured for initiating neighbor discovery based on generating a neighbor solicitation message targeting the IP destination address and for output by the IP network interface circuit into a network served by the apparatus, generating the hash index value for the data packet based on a combination of the IP destination address with a randomized token stored in the apparatus, and storing the data packet in a selected one of the pending message queue circuits based on the corresponding hash index value for the data packet matching the corresponding hash index value of the selected one pending message queue circuit, each pending message queue circuit distinct from the neighbor cache circuit and configured for storing stored data packets associated with the corresponding hash index value and awaiting respective solicited neighbor advertisement messages from the network;

the neighbor discovery circuit further configured for detecting a neighbor discovery denial of service attack based on a determined distribution of the stored data packets among the pending message queue circuits.

12. The apparatus of claim 11, wherein the neighbor discovery circuit is configured for detecting the neighbor discovery denial of service attack based on the determined distribution of the stored data packets being substantially even among the pending message queue circuits.

13. The apparatus of claim 11, wherein the neighbor discovery circuit is configured for determining the apparatus is not encountering the neighbor discovery denial of service attack based on the determined distribution of the stored data packets being substantially uneven among the pending message queue circuits.

14. The apparatus of claim 11, wherein the neighbor discovery circuit is configured for adding no IP address to the neighbor cache circuit until detecting reception of a corresponding solicited neighbor advertisement message identifying the IP address is reachable.

15. The apparatus of claim 11, wherein:

the IP network interface circuit is configured for receiving a solicited neighbor advertisement message from the network served by the apparatus and that specifies a target IP address;

the neighbor discovery circuit configured for validating the solicited neighbor advertisement message based on generating a candidate hash index value based on a combination of the target IP address with the randomized token, and determining whether target IP address is within one of the stored data packets stored in the pending message queue circuit corresponding to the candidate hash index value; and the neighbor discovery circuit configured for adding the target IP address to the neighbor cache, and causing the IP interface circuit to output the one stored data packet having the target IP message from the pending message queue circuit corresponding to the candidate hash index value, based on successful validation of the solicited neighbor advertisement message.

16. The apparatus of claim 15, wherein:

the neighbor discovery circuit is configured for generating the randomized token for a corresponding prescribed time interval, the randomized token for use in storing received data packets into one of the pending message queue circuits during the corresponding time interval;

the apparatus further comprising further comprising a token cache circuit configured for storing the randomized token and prior randomized tokens having been generated by the neighbor discovery circuit during respective preceding time intervals;

the neighbor discovery circuit configured for deleting from the token cache circuit, a stale one of the prior randomized tokens based on the corresponding preceding time interval having exceeded a prescribed aging interval for receiving a corresponding solicited neighbor advertisement message;

the neighbor discovery circuit configured for validating the solicited neighbor advertisement message based on repeating the generating of a corresponding candidate hash index value, for each prior random randomized token stored in the cache of prior randomized tokens, to determine whether target IP address is within the one stored data packets stored in the pending message queue circuit corresponding to the candidate hash index value for the corresponding preceding time interval.

17. The apparatus of claim 11, wherein the hash index value for the IP destination address is generated by the neighbor discovery circuit based on:

generating the combination based on concatenating the IP destination address with the randomized token;

generating a first hash value based on applying the combination to a prescribed hash function; and selecting a prescribed number of least significant bits from the first hash value as the hash index value for the IP destination address.

18. The apparatus of claim 17, wherein:

the neighbor discovery circuit is configured for generating the randomized token for a corresponding prescribed time interval, the randomized token for use in storing received data packets into one of the pending message queue circuits during the corresponding time interval;

the apparatus further comprising further comprising a token cache circuit configured for storing the randomized token and prior randomized tokens having been generated by the neighbor discovery circuit during respective preceding time intervals;

the neighbor discovery circuit configured for deleting from the token cache circuit, a stale one of the prior randomized tokens based on the corresponding preceding time interval having exceeded a prescribed aging interval for receiving a corresponding solicited neighbor advertisement message;

the randomized token and the prior randomized tokens kept secret within the apparatus.

19. The apparatus of claim 11, further comprising deleting by the neighbor discovery circuit any stored data packets having exceeded a prescribed aging interval for receiving the corresponding solicited neighbor advertisement message.

20. The apparatus of claim 11, wherein each pending message queue circuit has a corresponding number of the stored data packets, the determined distribution of the stored data packets among the pending message queues determined based on the neighbor discovery circuit identifying the respective numbers of the stored data packets among the respective pending message queue circuits.

21. An apparatus comprising:

means for receiving a data packet specifying an Internet Protocol (IP) destination address having an address prefix assigned to the apparatus;

a neighbor cache circuit configured for storing IP addresses of IP nodes having been determined as reachable by the apparatus;

means for storing a plurality of data packets awaiting respective solicited neighbor advertisement messages, each data packet indexed within the means for storing based on a corresponding hash index value; and means for initiating neighbor discovery in response to detecting an absence of the IP destination address within the neighbor cache circuit, the means for initiating initiating neighbor discovery based on generating a neighbor solicitation message targeting the IP destination address and for output by the means for receiving into a network served by the apparatus, generating the hash index value for the data packet based on a combination of the IP destination address with a randomized token stored in the apparatus, and storing the data packet in the means for storing distinct from the neighbor cache circuit and based on the corresponding hash index value for the data packet;

the means for initiating further detecting a neighbor discovery denial of service attack based on a determined distribution of the stored data packets in the means for storing, relative to the hash index values.

* * * * *